United States Patent [19]
Wolf

[11] 3,846,596

[45] Nov. 5, 1974

[54] SLIDE SWITCH FOR ELECTRICAL STRIP CABLE

[76] Inventor: Leo Wolf, 5701 Sheridan Rd., Chicago, Ill. 60660

[22] Filed: July 2, 1973

[21] Appl. No.: 375,527

Related U.S. Application Data

[62] Division of Ser. No. 212,457, Dec. 27, 1971, Pat. No. 3,763,307.

[52] U.S. Cl. .............................. 200/16 D, 200/294
[51] Int. Cl. ....................... H01h 15/00, H05k 1/04
[58] Field of Search .......... 200/11 DA, 16 C, 16 D, 200/166 PC, 166 CT, 292, 293, 294, 296, 303; 317/101 F; 174/70 C, 117 FF; 339/17 F

[56] References Cited
UNITED STATES PATENTS

| 3,525,828 | 8/1970 | Eckhart et al. | 200/16 D |
| 3,609,259 | 9/1971 | Drebin | 200/166 PC X |
| 3,763,307 | 10/1973 | Wolf | 174/117 FF |

Primary Examiner—James R. Scott
Attorney, Agent, or Firm—Fitch, Even, Tabin & Luedeka; Raiford A. Blackstone, Jr.

[57] ABSTRACT

An electrical strip cable assembly comprising a thin flat strip of flexible insulating material having a pressure-sensitive adhesive coating on a surface thereof for supporting a pair of metal foil conductors bonded thereto and further having a receptacle at an end of the strip for connecting the cable assembly to larger conventional cables. The receptacle includes a pair of terminals respectively connected to each of the conductors with each terminal comprising a generally elongated cylindrical member having a substantially flat surface portion in contact with its corresponding foil conductor. Each terminal is attached to its respective foil conductor by conductive tabs extending from the terminal through the foil conductor and bent to secure the terminal to the conductor. An on/off switch for the cable assembly is provided with a gradually sloping base having a pair of metal conductors on the upper side thereof which are adapted to mate with the foil conductors of the cable.

1 Claim, 13 Drawing Figures

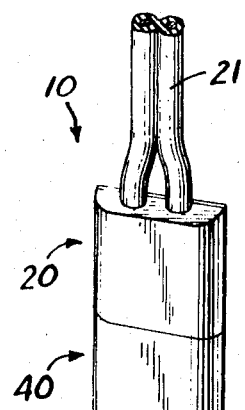
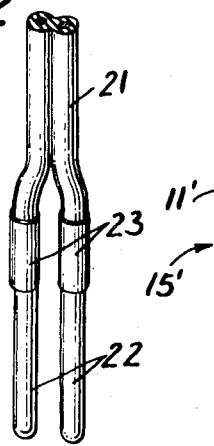
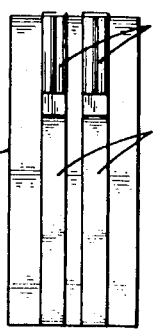
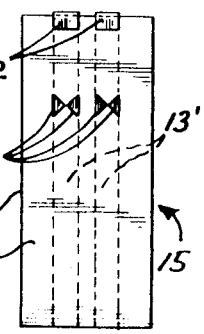
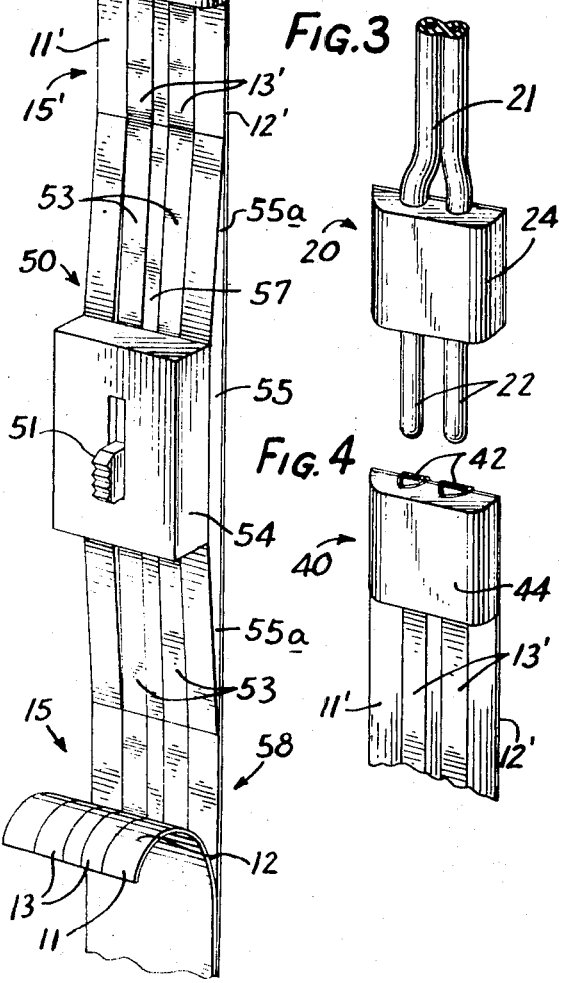
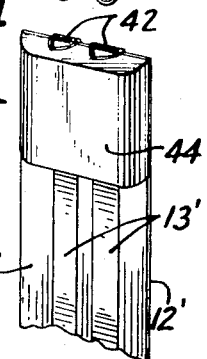
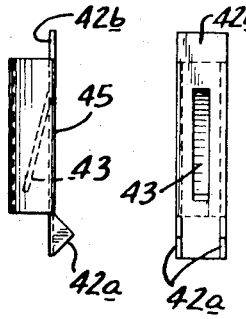
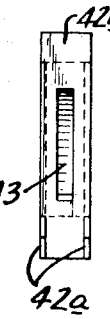
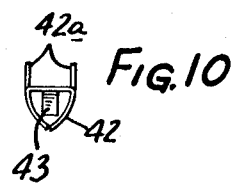

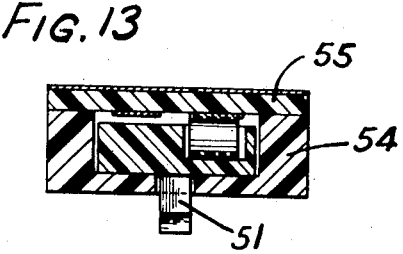
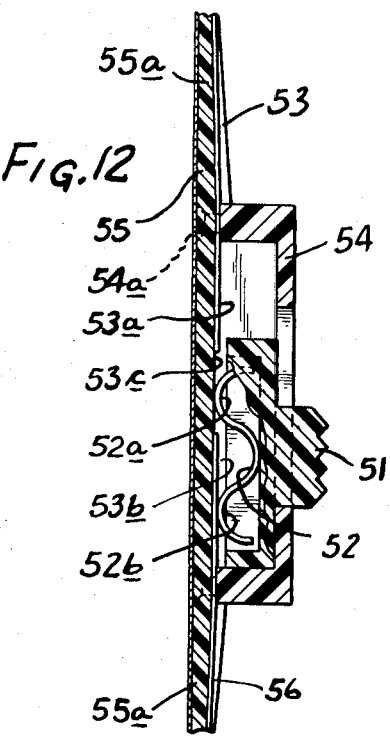
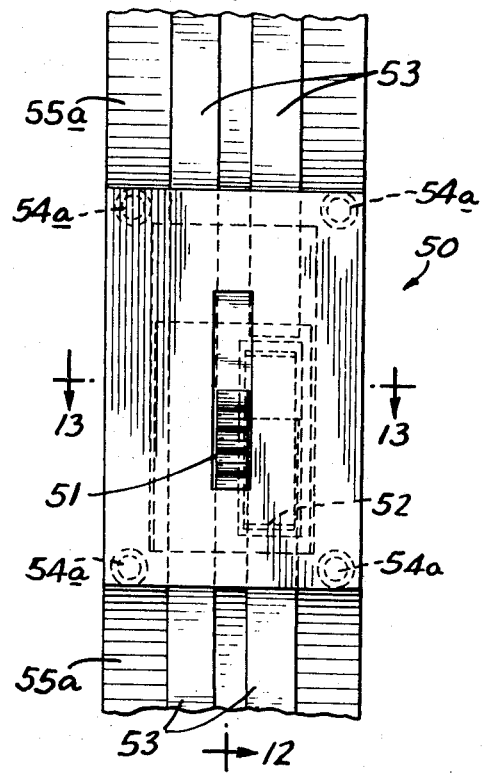

SLIDE SWITCH FOR ELECTRICAL STRIP CABLE

This is a division of Application Ser. No. 212,457, now U.S. Pat. No. 3,763,307, filed Dec. 27, 1971.

The present invention relates to electrical cable assemblies and particularly to cable assemblies having a relatively thin, flat configuration.

Relatively thin, flat electrical cable (sometimes referred to as "ribbon" cable) is generally useful in applications where space or appearance limitations do not facilitate the use of standard-sized electrical cable such as that commonly used for connecting remote loudspeakers to an amplifier or lowvoltage power applications. For example, it may be desirable to have an electrical cable run under a carpet and a conventional cable might be too thick in that it would cause an unattractive bulge or perhaps even create a safety hazard. Another example of the usefulness of flat cable is that of supplying power to a lamp fixture mounted above a wall-mounted picture or work of art. Generally, it is aesthetically undesirable to have a visible electrical cable or cord extending up the wall to such a lamp. A cable could be concealed within the wall but that would necessitate the inconvenience and expense of providing electrical conduit in the wall and an opening in the wall behind the picture through which to extend the cable for connection to the lamp.

A particularly attractive approach to this problem, especially for wall-mounted picture lamps, is to employ a relatively flat, thin electrical cable which may be attached to the wall with a pressure-sensitive adhesive, and then paint or wallpaper may be applied over it so that the cable is essentially unnoticable. A problem that remains, however, is that of attaching other electrical components such as lamps, on/off switches, or non-flat cables to the flat cable. By its very nature, the flat cable has very thin, fragile foil conductor elements which are generally not susceptible to common methods of electrical connection such as soldering, twisting, etc.

It is therefore an object of the invention to provide an improved ribbon cable assembly.

It is another object of the invention to provide such a cable assembly which is inexpensive to construct and which may be reliably connected to other electrical components.

Other objects and advantages of the invention are more particularly set forth in the following detailed description, and in the accompanying drawings, of which:

FIG. 1 is a perspective view of a ribbon cable assembly embodying principles of the invention;

FIG. 2 is a perspective view of internal components of the plug shown in the embodiment of the invention illustrated in FIG. 1;

FIG. 3 is a perspective view of the plug shown in FIG. 2 after it has been encapsulated;

FIG. 4 is a perspective view of an encapsulated receptacle for a flat cable assembly constructed in accordance with the invention;

FIG. 5 is a front elevational view of the receptacle shown in FIG. 4 without the encapsulation;

FIG. 6 is a rear elevational view of the receptacle shown in FIG. 5;

FIG. 7 is a front elevational view of the terminal employed in the receptacle illustrated in FIGS. 5 and 6;

FIG. 8 is a side elevational view of the terminal shown in FIG. 7;

FIG. 9 is a rear elevational view of the terminal shown in FIG. 7;

FIG. 10 is an end view of the terminal shown in FIG. 7;

FIG. 11 is a front elevational view of the on/off switch shown in the cable assembly of FIG. 1;

FIG. 12 is a cross-sectional view taken along line 12—12 of FIG. 11; and

FIG. 13 is a cross-sectional view taken along line 13—13 of FIG. 11.

With reference to FIG. 1, there is generally shown an electrical strip or ribbon cable assembly 10 in accordance with the invention including a cable 15 comprising a thin, flat strip 11 of flexible insulating material having a pressure-sensitive adhesive coating 12 on one surface thereof. The adhesive coating is generally covered with a release paper for protection. The insulating material is preferably constructed of a plastic material such as Mylar. The plastic material has a suitable porous coating to receive a coating of paint or be covered by wallpaper. As illustrated, a pair of metal foil conductors 13 are bonded to the same surface of strip 11 as adhesive coating 12 and extend longitudinally therewith. The bonding may be effected in any suitable manner including the use of the above mentioned pressure-sensitive adhesive. The length shown is relatively short for purposes of illustration and it is understood that strip 11 with conductors 13 and adhesive 12 may be of any desired length. Moreover, in some applications it may be desirable to bond conductors 13 on the surface opposite that bearing the adhesive coating. A plug 20 connects a conventional non-flat cable 21 to cable assembly 10 by means of a jack or receptacle 40 at one end of strip 11. Receptacle 40 is attached to a relatively short piece of flat cable 15' which is described in greater detail below with reference to FIG. 5. An on/off switch 50 is provided between cable 15 and cable 15' for making and breaking the circuit of which the assembly is a part, as hereinafter also described in greater detail.

More particularly, FIG. 2 illustrates the construction of plug 20 which is suitable for connecting conventional non-flat cable 21 to cable assembly 10 of the invention. As shown, plug 20 (with the encapsulation removed) comprises a pair of cylindrical terminal elements or pins 22 coupled to cable 21 by means of a suitable connection 23 which may, for example, include the soldering and/or crimping of elements 22 to the ends of cable 21. FIG. 3 shows plug 20 in its encapsulated form. The encapsulation or housing 24 is provided for protecting connection 23 and maintaining elements 22 in spaced alignment for mating with the terminal elements 42 of receptacle 40 of the invention shown in FIG. 4. Housing 24 may be of any suitable conventional form including a plastic cover, "potting," or the like.

In FIG. 5, the construction of receptacle 40 is shown in greater detail. With the encapsulation or housing 44 removed, a pair of terminal elements 42 are revealed which are respectively connected to the conductor elements 13' at the end of an insulating strip 11'. Strip 11' comprises a short length of flat cable 15' essentially identical to cable 15 of FIG. 1 except that it has the adhesive coating 12' (not shown here, see FIG. 6) on the surface opposite that to which the foil conductors are bonded. This construction facilitates the connection of cable 15 to receptacle 40 in that cable 15 is merely laid on top of cable 15' such that conductors 13 respectively mate with conductors 13' and adhesive 12 maintains the connection. By putting adhesive on the opposite surface of cable 15', the entire assembly (cable 15, cable 15', and receptacle 40) may be attached to a wall, for example, by merely pressing the assembly against the wall.

In FIG. 6, the rear of cable 15' and receptacle 40 is shown including the pressure-sensitive adhesive coating 12'. Each terminal element 42 has a pair of conductive tabs 42a which extend from the terminals through the respective foil conductors 13' and strip 11' and are bent over as shown to secure terminal elements 42 to conductive elements 13'. To improve the mechanical and electrical connection, each of terminals 42 are provided with additional conductive tabs 42b extending from the end of the terminal adjacent the end of strip 11' and bent over the end of the strip. Of course, terminal 42 may be directly connected to the end of the ribbon cable (such as cable 15) instead of an intermediate cable (such as cable 15').

FIGS. 7 through 10 illustrate in greater detail the construction of one of the terminal elements 42 comprising a generally elongated cylindrical conductive member having a substantially flat surface portion 45 in contact with one of the foil conductors 13' and adapted to mate with a similarly-shaped but slightly different-sized terminal. As illustrated, terminal elements 42 are employed as jacks adapted to mate in telescoping relation with a plug having similar shaped pins which are slightly smaller in diameter. Terminal elements 42 may be mounted on the surface opposite that on which the conductor ribbons are mounted; however, the electrical contact between the foil conductor and the terminal may not generally be as good. Conductive tab portions 42a and 42b are shown in an unbent state. Conductive tabs 42a are made pointed to facilitate extending them through the conductor element and the insulating strip by direct puncture. FIGS. 8 and 9 further illustrate one of terminal elements 42 and show resilient tongue member 43 extending from the substantially flat surface portion 45 of terminal element 42 into the interior thereof to frictionally engage a terminal element of a plug, such as terminal pins 22 of plug 20 in FIG. 2, to both releasably maintain the connection and improve the electrical contact.

With reference to FIGS. 11, 12 and 13, on/off switch 50 of the cable assembly shown in FIG. 1 is shown in greater detail. Switch 50 comprises an actuating member 51 operable to slide a resilient conductive contact member 52, having two foil-contacting portions 52a and 52b, within a switch housing 54 over a portion of a foil conductor element 53 having a discontinuous or open portion 53c, with the portions of foil conductor element 53 on either side of discontinuous portion 53c being referred to as 53a and 53b. Thus, when slide contact 52 is in one extreme position (i.e., the "off" position, as illustrated), contact portion 52b is touching foil conductor portion 53b but contact portion 52a is resting in the gap or discontinuous portion 53c so that the circuit of conductor 53 is broken. When sliding contact 52 is moved to the other extreme position (i.e., then "on" position, not illustrated), contact portion 52a is then in contact with foil conductor portion 53a and contact portion 52b remains in contact with foil conductor portion 53b thereby bridging the discontinuous portion 53c so that the circuit of conductor 53 is completed. As shown, only one of foil conductors 53 has a discontinuous portion and therefore only one resilient contact 52 is employed. Where desired, both foil conductors 53 may be constructed with a discontinuous portion and two resilient contacts may be employed in accordance with the principles of the invention. In addition, foil conductors 53 of switch 50 may be constructed and adhesively bonded in a manner similar to cables 15 or 15', or by using printed circuit techniques, or by any other suitable manner. Switch housing 54 is coupled to switch base 55 by means of connecting posts 54a. Housing 54 and base 55 may preferably be made from a plastic material so that housing 54 may be secured to base 55 by merely supplying sufficient heat to posts 54a to cause the ends thereof to melt sufficiently to fill the corresponding holes in base 55 and thus secure housing 54 to base 55.

More particularly, and in accordance with this aspect of the invention, the end portions 55a of base 55 are tapered and have a pair of conductive strips or elements 53 bonded to the upper surface of end portion 55a. Moreover, a recessed portion of approximately the same width as that of the combined conductor pair may be provided so that the top surface of switch base end portion 55a is flush when switch 50 is connected to a cable such as cable 15. The tapering of end portions 55a provides a gradual transition from switch 50 to the cable (such as cable 15 of FIG. 1) so that the assembly thereof, in combination with the above-mentioned recessed conductor feature, may be mounted on a wall in a relatively inconspicuous manner. For this purpose, the back of switch base 55 may be coated with a pressure-sensitive adhesive similar to adhesive 12 of cable 15. The connection of switch 50 to a thin, flat electrical cable, such as cable 15 shown in FIG. 1, may be easily accomplished in several ways depending on the particular type of connection and electrical component being connected. For example, receptacle 40 of FIG. 1 may be provided with a short piece of flat cable 15' as shown and may be connected to switch 50 by laying a piece of ribbon cable constructed like cable 15 (i.e., having the adhesive on the same surface of the insulating material as the conductive foil elements) on the top of an end portion 55a such that the foil conductors 13 of the cable respectively contact the foil conductors 53 of switch 50. Applying pressure causes the pressure-sensitive adhesive to maintain the electrical contact of the foil conductors. Connecting switch 50 to a relatively long section of cable 15 may be accomplished by laying cable 15 directly on top of end portion 55a such that foil conductors 13 respectively contact foil conductors 53 and adhesive 12 maintains the connection. Furthermore, an additional contact or "tail" portion 58 may be added to switch 50, as shown in FIG. 1, to mate with cable 15 to thus increase the amount of contact area to improve both the mechanical and electrical connection.

Thus there has been shown and described an improved electrical strip cable assembly. The assembly provides a simple and reliable receptacle and switch for connection to larger conventional cable or other electrical component. The construction of the assembly is relatively inexpensive and its overall appearance is attractive for the wiring of wall-mounted picture lamps or the like in an inconspicuous manner.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. An electrical switch adapted for use in an electrical strip cable assembly of the type having an elongated thin flat strip of flexible insulating material and a pair of parallel spaced metal foil conductors bonded to a surface of said strip and extending longitudinally therewith, said switch comprising:

a switch base having gradually sloping end portions;

a pair of parallel spaced metal foil conductors mounted on said base and extending across said sloping end portions, said switch conductors adapted to mate with said cable conductors, and with at least one of said switch conductors having a discontinuous portion therein;

a resilient contact member having two foil-contacting portions and operable to selectively bridge said discontinuous portion of said switch conductor to thereby complete the circuit of said discontinuous switch conductor;

actuating means for selectively sliding said resilient conductive contact member between a bridging position and a non-bridging position;

and means for securing said contact member and actuating means in an operative relationship with said base.

* * * * *